United States Patent
Gorobets et al.

(10) Patent No.: US 11,939,243 B1
(45) Date of Patent: Mar. 26, 2024

(54) DEVICE, SYSTEM, AND METHOD FOR FLOW-THROUGH-PLASMA-HYDRO-DYNAMIC-REACTOR-BASED WATER TREATMENT

(71) Applicant: PLASMIUS, INC, Redmond, WA (US)

(72) Inventors: Vladimir Leonidovich Gorobets, Redmond, WA (US); Andrey Makarov, Moscow (RU)

(73) Assignee: PLASMIUS, INC, Redmond, WA (US)

( * ) Notice: Subject to any disclaimer, the term of this patent is extended or adjusted under 35 U.S.C. 154(b) by 0 days.

(21) Appl. No.: 18/331,610

(22) Filed: Jun. 8, 2023

(51) Int. Cl.
| C02F 1/46 | (2023.01) |
| C02F 1/48 | (2023.01) |
| C02F 1/74 | (2023.01) |
| H05H 1/24 | (2006.01) |

(52) U.S. Cl.
CPC ............ *C02F 1/4608* (2013.01); *C02F 1/487* (2013.01); *C02F 1/74* (2013.01); *H05H 1/24* (2013.01); *C02F 2201/005* (2013.01); *C02F 2201/009* (2013.01); *C02F 2201/46175* (2013.01); *C02F 2209/008* (2013.01); *C02F 2301/024* (2013.01); *C02F 2301/026* (2013.01); *C02F 2303/04* (2013.01)

(58) Field of Classification Search
CPC ...... C02F 1/48; C02F 1/74; C02F 1/72; C02F 1/78; C02F 1/46; H05H 1/25; F25B 49/00; F02M 27/04
See application file for complete search history.

(56) References Cited

U.S. PATENT DOCUMENTS

| 2006/0049116 A1* | 3/2006 | Subramanian ......... F02M 27/04 |
| | | 210/748.01 |
| 2016/0272518 A1 | 9/2016 | Zolezzi-Garreton |

FOREIGN PATENT DOCUMENTS

| CN | 104129833 | 1/2016 |
| CZ | 308532 | 10/2020 |
| WO | 2014147645 | 9/2014 |

OTHER PUBLICATIONS

A Method of Pre-treating Coking Waste Water by Electrochemical Oxidizing-flocculation Group Technology; CN 101177330 A;May 14, 2008,Ren, Hong-qiang (Year: 2008).*

* cited by examiner

*Primary Examiner* — Walter D. Griffin
*Assistant Examiner* — Cameron J Allen
(74) *Attorney, Agent, or Firm* — Leonid Kisselev

(57) ABSTRACT

Water purification occurs under the influence of cold plasma obtained in water, which has a two-phase state, in which water and the smallest bubbles filled with gases dissolved in water are simultaneously present in the turbulence zone. The plasma is ignited inside the gas bubbles when exposed to an electric high-voltage nanosecond pulse. Since the turbulence zone located behind the flow body is saturated-saturated with fine bubbles, the plasma discharge in the bubbles becomes voluminous and diffuse in consistency. The combination of the hydrodynamic effect on water by the flow body and the generation of reactive oxygen species (ROS) in a volumetric plasma discharge in the turbulence zone causes a synergistic effect that increases the efficiency of water treatment.

20 Claims, 6 Drawing Sheets

DEVICE, SYSTEM, AND METHOD FOR FLOW-THROUGH-PLASMA-HYDRO-DYNAMIC-REACTOR-BASED WATER TREATMENT

FIELD

This application relates in general to water purification, and, in particular, to a system and method for plasma-hydrodynamic-reactor-based water treatment.

BACKGROUND

The variety of chemical and bacteriological pollutants that can contaminate water can make obtaining water of a purity sufficient for a particular purpose, such as water pure enough for drinking, a challenge. Existing devices for water purification possess many shortcomings that make them insufficient in many circumstances.

For example, a device for treating water with acoustic cavitation and electrical discharge in order to disinfect the water is described in Chinese Patent No. CN104129833A. The disadvantage of this device is the complexity of building a reactor and the small area of the cavitation cloud where the plasma discharge burns. The great complexity includes the complexity of electrical separation of the igniting electrodes and the acoustic ultrasonic emitter. Due to the complexity, there is a greater probability of a breakdown on the acoustic voltage emitter that supports the combustion of the plasma discharge. Further, a high level of electrical power supplied to power the ultrasonic acoustic emitter increases the chances of a breakdown.

A further device for treating water using a plasma discharge in the cavitation mode with the ignition of an electric arc between the electrodes located inside the device is described in Czech Republic Patent No. CZ308532B6. The disadvantage of this device is that cavitation is created using venturi-type devices, which require large pressures of the incoming liquid. Venturi-type devices do not allow to create an extended area of cavitation and, accordingly, a large plasma discharge, and thus burning in this area has a limited volume. Further, ignition and maintenance of the combustion of a plasma discharge by igniting an electric arc requires a lot of energy, and there is a rapid wear of the electrodes as a result of the emission of the electrode material under the action of an electric arc and the ingress of the electrode material into the treated water.

A still further water treatment device is described in International Publication No. WO2014147645A2 (645 publication), which uses cavitation and ultraviolet light and infrared radiation. The water in this device is treated with a venturi cavitator in combination with a rotary cavitator, with the '645 publication stating that purification of water from soluble salts and a decrease in hardness is achieved. The disadvantage of the described device is that the water is not purified from microbiological contaminants. Further, not all salts in the device turn into insoluble compounds. In addition, the complexity of the device, including high pressures at the inlet to the venturi cavitator (supply water pressure of at least 20 bar), requires use special hydraulic lines and, accordingly, a high cost of maintenance.

Finally, a still water treatment device, described in US Patent Application Serial No. 2016/0272518A1, is designed to produce purified water used to supply drinking water from various primary sources. The device is a flow-through hydrodynamic cavitation plasma reactor in which plasma is ignited in a cavitation cloud. The device consists of a high-pressure cavitator (about 40-60 bar), quartz tubes with ring electrodes, between which plasma is ignited. The disadvantages of this solution are the high pressure used to produce cavitation. To create such pressure at the inlet to the cavitator, use of special high-pressure pumps and supply lines is necessary. High-pressure pumps have a limited resource and need maintenance. The plasma is ignited in this device by harmonic signals, which entails high electrical power consumption, large electrical losses, and limited operating time as a result of heating the plasma reactor.

Accordingly, there is a need for a development of a reliable, device and method for obtaining water purified from bacteriological and chemical contaminants.

SUMMARY

The device, system and method disclosed can be used for purification and disinfection of water, including drinking water and sewage, though other kinds of water can also be purified. The system and method can be used a variety of industrial enterprises, including in agriculture, medical, special institutions, as well as in everyday life. Water purification occurs under the influence of cold plasma obtained in water, which has a two-phase state, in which water and the smallest bubbles filled with gases dissolved in water are simultaneously present in the turbulence zone. The plasma is ignited inside the gas bubbles when exposed to an electric high-voltage nanosecond pulse. Since the turbulence zone located behind the flow body is saturated-saturated with fine bubbles, the plasma discharge in the bubbles becomes voluminous and diffuse in consistency. The combination of the hydrodynamic effect on water by the flow body and the generation of reactive oxygen species (ROS) in a volumetric plasma discharge in the turbulence zone causes a synergistic effect that increases the efficiency of water treatment. The essence of the synergy lies in the fact that separately hydrodynamic effects on water can affect organic pathogens in water with an efficiency not exceeding 10%. At the same time, the creation of an energy-efficient stable volume discharge of cold plasma in a water stream in the absence of bubbles in the turbulence zone is unlikely. Thus, the combination of the bubbles created due to turbulence and the creation of the volumetric plasma discharge results in a significant improvement in efficiency of the water treatment.

Cold plasma discharge within turbulent fine bubbles effectively produces various ROS, such as hydroxyl radicals (·OH), superoxide anion (O2-), hydrogen peroxide (H2O2), and singlet oxygen. The water flowing through a hydrodynamic plasma reactor becomes saturated with these particles. The hydroxyl radicals (and other ROS) impact organic pathogens in water by disrupting their cell membranes, causing cell death. They also react with proteins and enzymes, inhibiting cellular growth and reproduction. Additionally, ROS damage the genetic material of pathogens, impairing their ability to replicate and survive. Overall, ROS effectively inactivate organic pathogens by damaging cell membranes, proteins, enzymes, and genetic material. Efficiency depends on factors like ROS concentration, exposure time, water quality, and pathogen characteristics.

In one embodiment, a system for flow-through-hydrodynamic-plasma-reactor-based water treatment is provided. The system includes a housing; a channel within the housing, the channel including an entrance into one which water including one or more contaminants enters and an exit from which the water exits; an electrically conductive flow body installed in the channel and which at least some of the water encounters while flowing from the entrance to the exit, wherein the water that encounters the flow body flows around the flow body and creates a zone of turbulence after flowing around the body within which the water is in a two-phase state and includes bubbles; an electrode located within the channel between the flow body and the exit; a pulse generator configured to apply one or more high voltage nanosecond duration pulses to the electrode and to the flow body, wherein the application of at least one of the pulses to the flow body and the electrode initiates an ignition in the zone of turbulence of a volumetric plasma discharge that generates one or more reactive oxygen species and wherein at least some of the contaminants are oxidized upon encountering the reactive oxygen species.

In a further embodiment, a method for hydrodynamic-plasma-reactor-based water treatment is provided. Water that includes one or more contaminants is provided into a channel within a housing, the channel comprising an entrance into one which the water enters and an exit from which the water exits, wherein an electrically conductive flow body is installed in the channel which at least some of the water encounters while flowing from the entrance to the exit, wherein the water that encounters the flow body flows around the flow body and creates a zone of turbulence after flowing around the body within which the water is in a two-phase state and comprises bubbles. One or more high voltage nanosecond duration pulses are applied to the flow body and an electrode located within the channel between the flow body and the exit, wherein the application of at least one of the pulses to the flow body and the electrode initiates an ignition in the zone of turbulence of a volumetric plasma discharge that generates one or more reactive oxygen species and wherein at least some of the contaminants are oxidized upon encountering the reactive oxygen species.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

DETAILED DESCRIPTION

The task the system and method described below are directed to is an improved way for obtaining water purified from undesirable bacteriological and chemical contaminants. The technical result of the system and method is implementing a way for treating water in a flow-through plasma hydrodynamic reactor of low pressure, in order to purify the water from various types of pollutants by oxidizing the pollutants with hydroxyl radicals (or other to their neutral compounds, as well as increasing the safety and efficiency of such purification.

Figure 1:
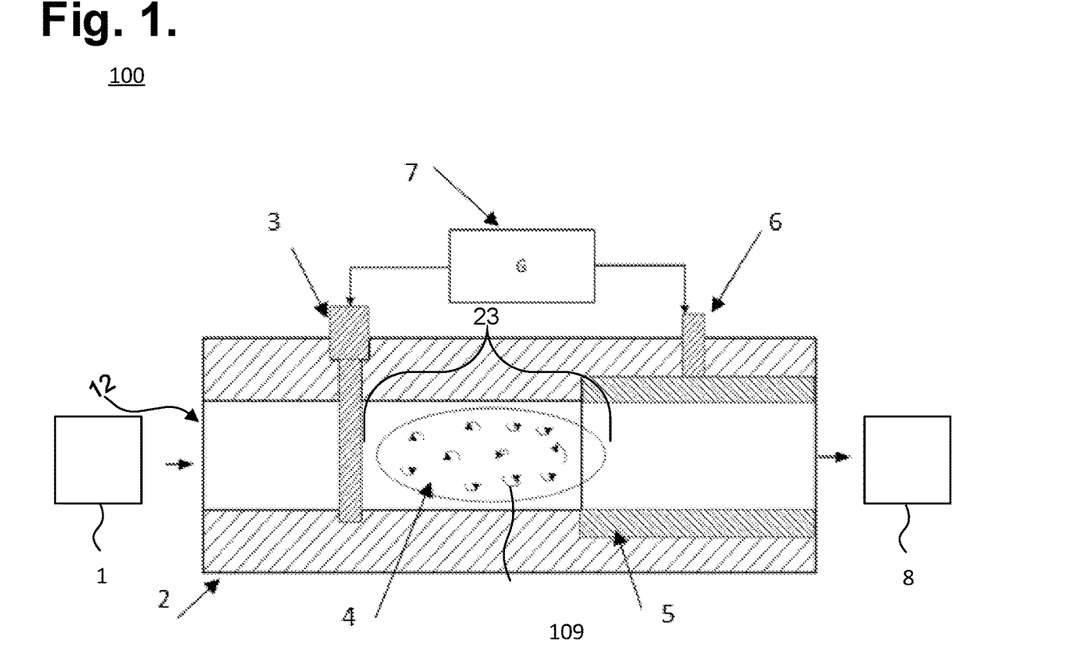
FIG. 1 is a structural block diagram of a flow-through-hydrodynamic-plasma-reactor-based water treatment device in accordance with one embodiment.

FIG. 1 is a structural block diagram of a flow-through-hydrodynamic-plasma-reactor-based water treatment device 100 in accordance with one embodiment. In the description below, the device 100 is also referred to as a flow-through hydrodynamic plasma reactor. In one embodiment, the device is a monoblock that can be integrated into existing hydraulic water lines. The device 100 can operate both from standard voltage power lines, from an power source such as a battery (either within the housing 2 or outside the housing 2 but electrically interfaced to components within the housing), and an autonomous power supply, such as a diesel generator or renewable energy sources such as solar or wind power plants. The device works as follows.

The device 100 includes a housing 2 within which a channel 22 is formed. The housing 2 of the device 100 is made of a dielectric material. Water, which can include contaminants such as pathogens (such as pathogenic viruses, fungi, protozoa, or bacteria), enters an entrance of the channel 22 from a water line or from another source. The water entering the channel 22 must be under a pressure of at least 1.5 bars(. In one embodiment, the water velocity is between 4 m/s and 20 m/s, though in a further embodiment, other velocities are possible.

The water 1 flowing at the velocity in the specified range runs into a flow body 3 installed in the channel 22. The shape of the flow body 3 can include a cylinder, though other shapes, such as a prism, rectangle, pin with threaded grooves, or a spiral, are possible. The flow body 3 is made of a conductive material, such as stainless steel, though other conductive materials are also possible. As shown with reference to FIG. 1, a part of the flow body extends beyond the channel 22 and through the housing 12, making the portion of the flow body 3 that extends beyond the outer surface of the housing accessible to receiving electrical pulses and for the flow body to serve as an electrode.

When water 1 flows around an obstacle in the form of the flow body 3, a turbulence zone 23 is formed behind the flow body 3 (on a side of the flow body facing the exit from the channel 22). The degree of turbulence depends on the velocity of the flow of water 1 as well as the shape and size of the flow body 3 and the pressure under which the water 1 is supplied. The higher the velocity of the flow of the water encountering the flow body 3, the higher is the turbulence (and the greater is the space occupied by the zone of turbulence 23) and the greater is the area occupied by the volumetric plasma discharge 4 that is formed as described below. In one embodiment, the shape and size of the flow body 3 chosen in the form of a cylindrical pin with a diameter of 1 mm to 10 mm, with the diameter depending on the size of the reactor 100 and a desired performance of the reactor 100. The level of turbulence can be increased by adding threaded grooves to the cylindrical pin (or other shapes of the flow body 3), with the cylindrical pin with threaded grooves providing the greatest amount of turbulence of the tested shapes. In the turbulence zone 23, the water turns into a two-phase state, which is a mixture of the fine bubbles (from 10 μm or less in diameter) and water. The bubbles are filled with vapors of gas dissolved in the source water. The vapor pressure of the dissolved gas in the bubbles is less than atmospheric and can range from 10 kPa to 50 kPa. The greater is the turbulence, the greater is the number of bubbles in the water in the turbulence zone 23 and the smaller is the diameter of the bubbles in the zone.

As mentioned above, the flow body 3 is made of a conductive material and can be used as one electrode used to ignite a plasma. A second electrode 5 is also integrated in the channel 22 and is closer to the exit from the channel 22 than the flow body. The second electrode 5 can be made in the form of a ring or cylinder, though in cases where the shape of the housing 2 is not cylindrical, other shapes of the second electrode 5 that conform to the shape of the housing are also possible. The second electrode is made of a conductive material, such as stainless steel, though other electrically conductive materials are also possible. The second electrode 5 is galvanically (electrically) connected to the current-carrying electrode 6.

The device 100 further includes a generator that provides power to the flow body 3 and the second electrode 5 (by providing the power to the current-carrying electrode 6 electrically interfaced to the electrode 5). The generator provides the power 3 as a high voltage pulse (ignition pulse) from 5 to 10 kV that initiates the ignition of a cold plasma discharge 4 in the bubbles within the gas bubbles of the turbulence zone. The pulses are provided while the cold plasma discharge 4 continues to be necessary (while water is flowing through the device 100) and the frequency with which the pulses are provided can be 20 pulses per second to 20000 pulses per second (20 hz to 20 khz), though in a further embodiment other frequencies are possible. Since the liquid experiencing a strong turbulence is a 2-phase structure (gas bubbles and the liquid around them), the so-called volumetric plasma discharge 4 occurs within the device 100. The density of the cold plasma depends on the degree of turbulence in the turbulence zone 23. The higher the turbulence of the flow behind the flow body 3, the more bubbles of dissolved gas in the water and the smaller their size (from 10 μm or less), the higher the density of the plasma and the uniformity of the plasma's distribution over the internal volume of the channel 22 of the reactor. The quality of treated water treated with plasma at the exit of reactor 100 depends on the density—the higher the density of the plasma, the greater is the degree of disinfection of the water that is achieved due to the contaminants in the water encountering the ROS 109 such as hydroxyl radicals generated in the volumetric cold plasma discharge more often. Further, the greater the size of the volumetric cold plasma discharge 4, the greater is the interaction of the ROS with the organic contaminants (such as pathogens) within the water 1 and the greater is the degree of the water purification. In one embodiment, the volumetric cold plasma discharge 4 could occupy the entire length of the channel 22 between the flow body 3 and the electrode 5, though other lengths of the discharge 4 are also possible. The discharge 4 begins on at the beginning of the zone of turbulence 23 (where the bubbles are present) and ends at the electrode 5. The length of the discharge 4 can depend on the degree of the ionization of the discharge 4, the velocity of the water 4, the size and shape of the flow body 3 and the electrode 5, though other factors determining the size of the discharge are also possible.

Cold plasma is a partially ionized gas containing various reactive species, including ROS 109. ROS 109 refers to a group of chemically reactive molecules containing oxygen and an unpaired electron, making them highly reactive. ROS 109 can include superoxide anion (O2-), hydrogen peroxide (H2O2), hydroxyl radical (OH·), and singlet oxygen (^1O2).

Figure 2:
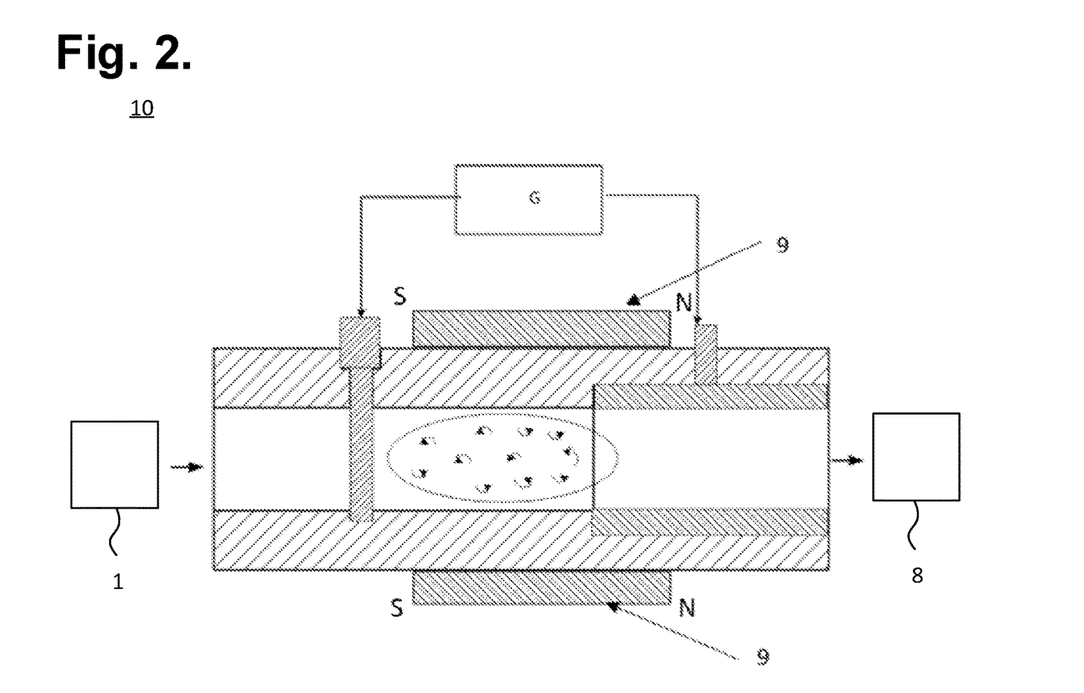
FIG. 2 is a diagram of a flow-through-hydrodynamic-plasma-reactor-based water treatment device of FIG. 1 in accordance with a further embodiment.

The efficiency of the water treatment can further be increased by equipping the flow-through hydrodynamic plasma reactor with one or more additional components 9 that creates an external magnetic field that is applied to volumetric plasma discharge. FIG. 2 is a diagram flow-through-hydrodynamic-plasma-reactor-based water treatment device 100 of FIG. 1 in accordance with a further embodiment. As reactive oxygen species have electric charges, the magnetic field of magnetic components 9 affects the trajectory of their movement. In one embodiment, the components 9 can be an axially magnetized permanent magnets 9 that are located on the outside of the housing 2 in the gap between the electrodes 3 and 5; when two magnets 9 are used, the magnets 9 can be located on opposite sides of the housing 9. The interaction of the magnetic flux of the permanent magnet 9 with the charged particles of the ROS 109 in the volumetric plasma discharge moving in the water flow causes a change in the trajectory of the charged particles. The trajectory of the motion of charged particles in the magnetic field of a permanent magnet acquires a spiral shape according to Lorentz's law. As a result, the degree of interaction of the ROS 109 in the volumetric plasma discharge 4 with the contaminants in the flow of water passing through the reactor increases. And, as a result, the efficiency of water treatment with plasma discharge increases. The one or more permanent magnets 9 can be replaced with one or more electromagnets 9 powered by a constant, alternating or pulsating current and that are located in the same positions as the permanent magnets. In addition, the use of an electromagnet allows to quickly adjust the parameters of the interaction of the external magnetic field with the ROS 109, thereby controlling the effectiveness of the impact. Once the water 1 passes through the zone occupied by the volumetric plasma discharge 4, the water exits the device 100 through the exit in the channel as plasma treated water (PAW) 8.

Figure 3:
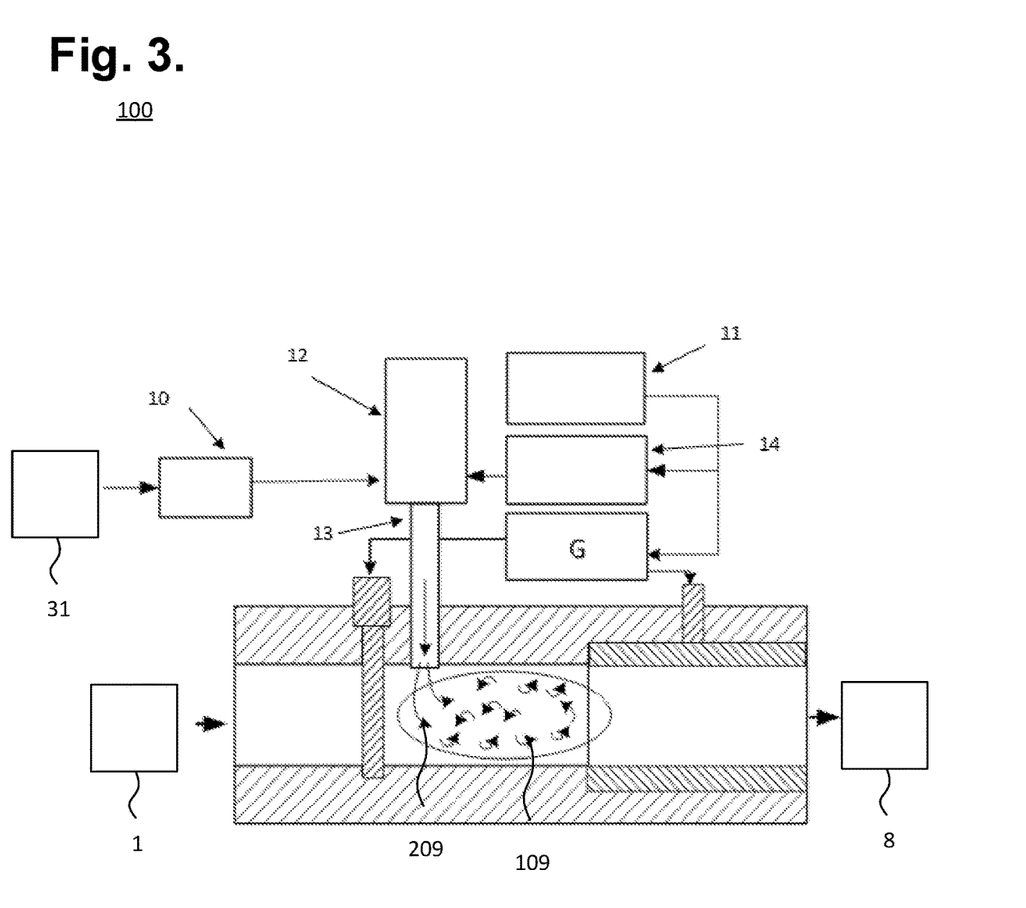
FIG. 3 is a diagram of a flow-through-hydrodynamic-plasma-reactor-based water treatment device of FIG. 1 in accordance with a further embodiment.

In a still further embodiment, in addition to disinfecting the water, the device 100 can be used to provide into the water reactive nitrogen species (RNS) 209 that promote plant growth and make the PAW 8 from the device 100 particularly useful in agriculture, as further described with reference to FIG. 3. FIG. 3 is a diagram of a flow-through-hydrodynamic-plasma-reactor-based water treatment device 100 of FIG. 1 in accordance with a further embodiment. The device 100 in this embodiment can be used in the agricultural sector in order to obtain PAW saturated with nitrogen and oxygen compounds. PAW 8 treated with a flow-through hydrodynamic plasma reactor can be used to increase yields and combat stressful environmental conditions in the agricultural sector. The increase in the content of nitrate and nitrite ions in PAW 8 has a beneficial effect on plant growth. Watering with plasma-activated water when sowing seeds in the ground also accelerates their germination and increases germination. In addition, the development of the root system, the growth of the stem and leaves is accelerated upon exposure to RNS 209.

The main factors causing the improvement of seed germination and plant growth are its bactericidal and fungicidal properties and the stimulating effect of a small amount of nitrites and nitrates that accumulate in the water. The low energy consumption for the production of PAW 8 makes this technique attractive for use in greenhouse cultivation of vegetables, including in systems using drip irrigation or in hydroponics. Many PAW studies have shown that the main active substances of PAW are ROS 109 and RNS 209.

RNS 209 are derived from nitrogen-containing compounds, such as nitric oxide (NO), nitrogen dioxide (NO2), peroxynitrite (ONOO—), and nitrous oxide (N2O). The production of RNS 209 in biological systems is closely linked to the production of ROS. In particular, nitric oxide (NO) is a key signaling molecule that can react with other molecules to form RNS. For example, NO can react with superoxide anion (O2-) to form peroxynitrite (ONOO—), a potent oxidant and nitrating agent.

Nitrogen (N2): Nitrogen is the most abundant gas in the Earth's atmosphere, accounting for approximately 78% of the total air volume. RNS 209 includes nitrates, nitrites, peroxynitrites, nitric oxide radical, ammonia and nitrogen, though other RNS are possible. Active nitrogen forms RNS 209 in PAW 8 can be used as a nutrient for seed germination.

To obtain nitrogen compounds in a stream of water passing through the device, supplying molecular nitrogen N2 to the zone occupied by the volumetric plasma discharge 4 is necessary.

To generate RNS from ambient air, an air-plasma reactor 12 is used. The reactor 12 can implement any of the known types of high-voltage discharges in gases, such a corona discharge, a discharge with a dielectric barrier, a spark discharge, a low-current arc discharge, a pulse discharge, though other types of high-voltage discharges are possible.

In addition to the elements described above with reference to FIG. 1, the embodiment of the device 100 shown with reference to FIG. 3 includes additional components. In particular, in this embodiment, the device 100 also includes an air supply device that supplies air purified from dust to the air-plasma reactor 12; the air-plasma reactor 12 that produces nitrogenous compounds; a connecting tubular line 13 for input of providing the products of the air-plasma reactor (such as the nitrogenous compounds) into the channel 22. The device 100 further includes a power supply 11 that the generator 7. The power supply 11 can be connected to one or more sources of power such as a line network (such as a power grid), a renewable energy source (such as a solar panel, generator or another on-board network), a battery; the power supply 11 adjusts the power received from these sources into the level usable by the generator 7. The power supply 11 is further connected to a further power supply 14 that adjusts the power received from the power supply 11 to levels usable by the air-plasma reactor 12 and provides the adjusted power to the air-plasma reactor. The voltage of the power provided by the power supply 11 to the generator 7 and to the power supply 14 can be same or different from each other. The device 100 in the embodiment shown with reference to FIG. 3 works as follows. At the opening of the channel 22 of the device, water 1 from the primary source (such as a storage tank, water supply, water area, or other primary sources) enters the channel 12 under pressure. As described above, a turbulence zone 23 is formed behind the flow body 3, in which the water 1 is in a two-phase state, and a plasma discharge is ignited in the gas bubbles inside the turbulence zone 23. Further, through an air supply device 12, which includes at least an air purification filter and a compressor, the purified atmospheric air is supplied under some overpressure (such as 103 kilopascals to 130 kilopascals, though other pressures are also possible to the plasma reactor 12. In the reactor 12, air passes through a plasma discharge implemented using any of the known principles, such as corona discharge, barrier discharge, spark discharge, low-current arc discharge or pulse discharge, though other ways to create a plasma discharge are also possible. As a result of exposure to any of these types of discharge in the air, active nitrogen compounds (RNS) 209 are generated in the air, which through the connecting channel 13 the zone between the flow body 3 and the electrode 5 where the volumetric plasma discharge 4 is located. Thus, the water flow passing through the channel 12 is mixed with RNS 209. As a result, at the outlet of the flow-through hydrodynamic plasma reactor, water purified from biological contaminants and supplied with (RNS) 209 is obtained.

The percentage of primary water entering the opening of the channel 12 and the air supplied to obtain reactive nitrogen species is selected as 100 to 1, i.e., 1 liter of air is supplied per 100 liters of incoming water. This ratio was chosen for reasons that an increase in the air supply would not maintain the stability of the volumetric plasma discharge in in the flow of water passing through the reactor.

Exemplary mechanisms of formation of RONS 109 and RNS 209 in plasma activated water in a reactor for use in the agricultural sector (and potentially other sectors) are described below.

Hydroxyl radicals: OH·: $H2O+H2O \rightarrow H++OH·H2O$
Atomic oxygen: O: $O2+H2O \rightarrow O+O+H2O$
Superoxide: O2-: $e-+O2 \rightarrow O2-$
Ozone O3: $O2+OH· \rightarrow O3+H$
Hydrogen Peroxide H2O2: $OH·+OH· = O+H2O2$
Nitric oxide: NO: $O+N2 \rightarrow NO+N$
Nitrogen dioxide: NO2: $NO+OH· \rightarrow NO2+H$
Peroxynitrite: ONOO—: $NO·+O2- \rightarrow ONOO—$
Nitric acid ion NO3-: $ONOO— \rightarrow NO3-$
Dinitrigen oxide: N2O: $N+NO2 \rightarrow N2O+O$
Nitrous Anhydride: N2O3: $NO+NO2 \rightarrow N2O3$
Molecular nitrogen ion N2+: $N2-e- \rightarrow N2+$ The device 1000 of FIG. 3 can be also supplemented with magnets 2 as described above with reference to FIG. 2.

In addition, as further described below, while the components of the device 100 of FIGS. 1-3 can be controlled manually, control can be automated via the use of a controller, as further described below. The controller can include a microcontroller coupled to a memory storing program instructions for execution by the microcontroller, with the program instructions controlling parameters and timing of the operations of the device. The controller can be attached to the housing 2 (either internal to the housing 2 or is attached to the external surface of the housing as part of a user interface for controlling the device 100). Alternatively, the controller can be external to the housing, and can include computing devices such as a desktop computer, a laptop computer, a tablet, or a mobile phone, though other types of computing devices are possible. In that embodiment, the computing device can be interfaced to the components of the device, either through a wired or wireless connection, and control execution of the operations of the device 100 based on program instructions.

Figure 4:
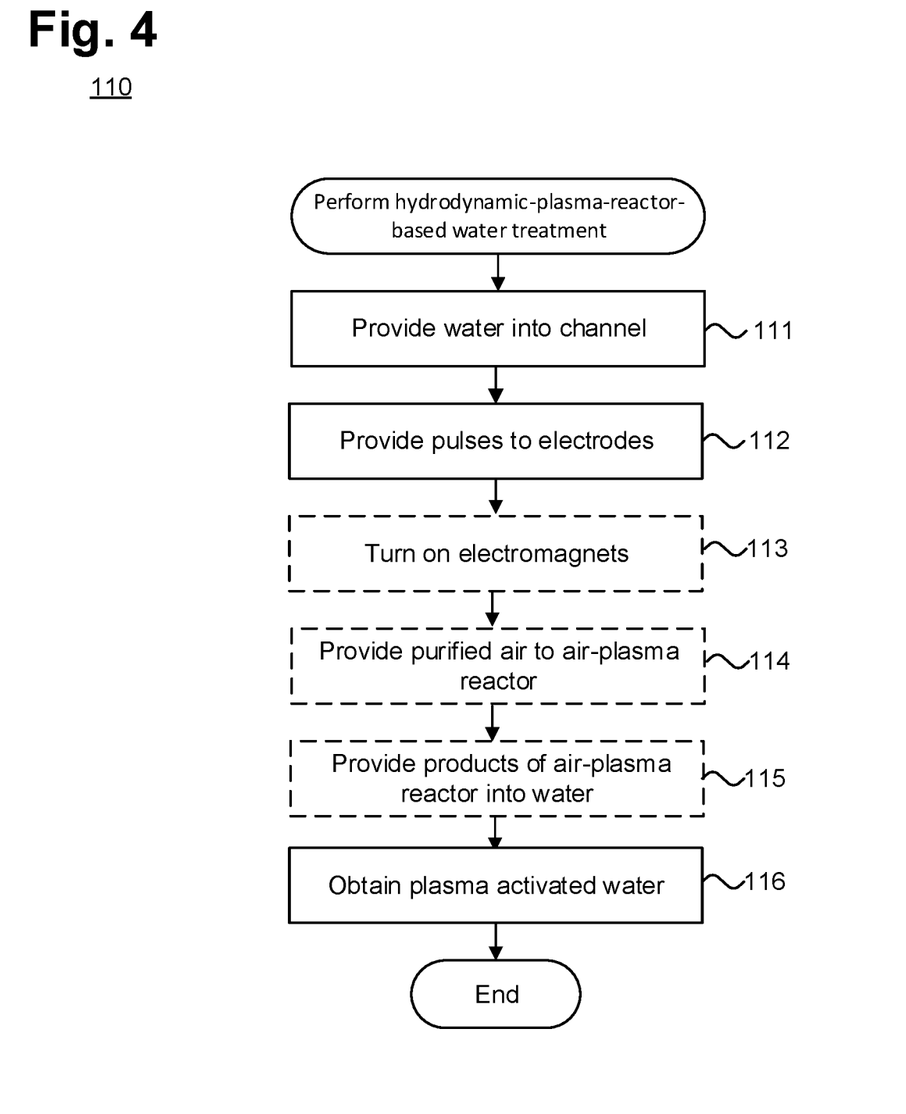
FIG. 4 is a flow diagram showing a method for flow-through-plasma-hydrodynamic-reactor-based water treatment using the device of FIGS. 1-3 in accordance with one embodiment.

The three embodiments of the device 100 of FIGS. 1-3 can be used to efficiently treat water from pathogenic contaminants. FIG. 4 is a flow diagram showing a method 110 for flow-through-plasma-hydrodynamic-reactor-based water treatment using the device 100 of FIGS. 1-3 in accordance with one embodiment. Water 1 that has one or more contaminants is provided into the opening of the channel 22 of the device 100 (step 111). Pulses of power are provided to the electrode 5 and the flow body 3, generating the volumetric plasma discharge 4 and ROS 109 (step 112).

Optionally, if available and if not already provided by permanent magnets 9, the electromagnets on the housing are turned on to apply a magnetic field to the ROS 109 within the volumetric plasma discharge (step 113). Also optionally, air is purified by the air supply device 11 and is provided to the air-plasma reactor (step 114), where RNS 209 are generated and in turn provided (step 115) through the line 13 into the channel 22. Plasma treated water 8 is obtained at the exit (outlet) of the channel 22 (step 116), concluding the method 110.

The device 100 can have a variety of applications and integrated into a system with other components. For the purposes of illustration and not limitation, some of the applications of the device in accordance with one embodiment are described below. Other systems into which the device 100 can be integrated are also possible.

Water Pool Integration Application

The device 100 can be used in the pool in a variety of ways.

Figure 5:
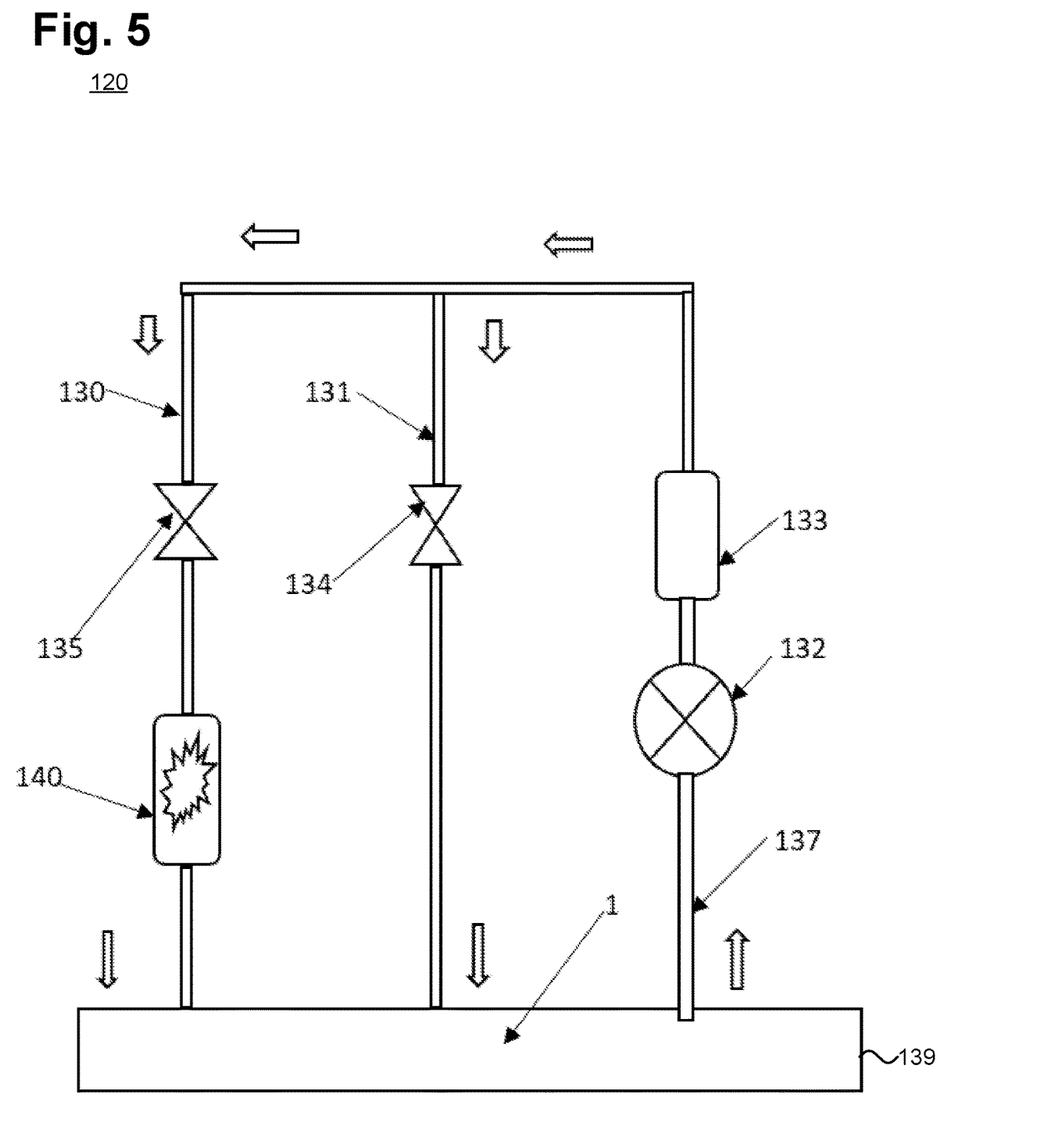
FIG. 5 is a diagram a system showing the device integrated into existing hydraulic water lines of a pool in accordance with one embodiment.

One option is embedding the device 100 in existing hydraulic water lines. The pool can be either a swimming pool with a closed water supply system, or an agricultural enterprise with the device 100 integrated into the irrigation system, or a water supply system for processing products, or a livestock or poultry farm. FIG. 5 is a diagram a system 120 showing the device 100 integrated into existing hydraulic water lines 110 of a pool 139 in accordance with one embodiment. The device 100 can be of either of the embodiments described above with reference to FIGS. 1-2. Replacement of existing equipment is not required for the integration. Only one line is added to the existing plumbing layout, which includes a valve and a module within which the device 100 is located. The device 100 could be integrated into pool sanitation system. The device 100 sanitizes pool water by injecting high-density hydroxyl radicals (or other ROS) into the water stream that is run through the device 100.

Hydroxyl radicals generated by the device 100 are a great option for recreational water treatment since they are both highly effective and non-corrosive to pool surfaces and equipment. The system requires almost no maintenance and uses very little power, is efficient to operate, offers years of trouble-free service, and is eco-friendly, free of external chemicals, highly effective, non-corrosive, and is compatible with both primary and secondary water pool treatment system. The use of the device allows efficient energy use per volume of treated water and drastically reduce the energy consumption of current water treatment systems.

The device 100 realizes the hybrid of the turbulence zone and cold plasma technologies to perform deep treatment on water, as described above. Using high intensity cold plasma discharge in a turbulence zone 23 to rapidly disinfect and demineralize the water the device 100 destroys a number of dangers pathogens and produces pure and safe water.

Independent case studies have shown that Hydroxyl-Based pool sanitation systems can decrease DBPs (Disinfection By-products) by up to 90 percent, reducing dependence on chlorine and other chemicals. However, if chlorine is required by health codes or regulations, the device 100 can operate in tandem with chlorine.

Existing circulating pool water supply systems includes at least a water pump 132, a filter 133, a suction line 137 and general return line 131, as shown with reference to FIG. 5. When the water pump 132 is running, the water 1 from the pool is sucked into the suction line 137. The water 1 passes through the water pump 132, is cleaned of large contaminants by the filter 133 and enters the general return line 131.

The use of the device 100 changes such system in that the general return line has a bifurcation into two lines. The first line 131 is equipped with a valve 134. The second line 130 is equipped with a valve 135 and a module 140 within the device 100 located. In addition to the device 100, the module 140 includes physical connections that allow the module to connect to the second line 130. The input of the valve 135 is connected to the general return line 130, the output of the module 140 is connected to the continuation of the general return line 130.

In this embodiment, the device 100 is equipped with a high-voltage switching power supply, which is powered by mains electricity. Valves 134, 135 can be manual, automatic and semi-automatic. A programmable control system can be used to control the state of the open-closed valves, which, with a certain cyclicity and duration, can control the open-closed condition of the valves. In this embodiment, the device 100 works as follows.

At the level of contamination of water in the pool located within the acceptable limits (such as mandated by government regulations), or during the cycle of normal water exchange of water in the pool, the water can be recirculated without use of the device 100. In particular, the water 1 from the pool is sucked into the main suction line 137, passes through the water pump 132, is cleaned of coarse contaminants by the filter 133 and enters the main return line 131. The water passes through the open valve 134 and and returns to the pool 139 via the line 131. Routine circulation of water happens in this way.

According to a given cycle, automatically, either when the level of contamination of water in the pool exceeds a threshold when sensed by sensors, or at the user's command, the valve 135 opens to allow the water into the module 140, and the valve 134 closes. At the same time, the water 1 from the pool through the suction line 137 passes through the water pump 132 and filter 133 and then enters the return line 130 and then through the open valve 135 into the module 140 with the device 100 located inside. When inside the device 100, the flow of water interacts with the flow body 2 and a volumetric plasma discharge 4 is formed as described above. ROS, are formed, which saturate the water flow passing through the device 100.

Due the action of hydroxyls and other oxidation reagents, organic inclusions in water are deactivated and harmful chemical elements (such as harmful, bioaccumulative organic pollutants) are decomposed into harmless ones (such as water and carbon dioxide).

Following exiting from the device 100, the treated water 8 enters the pool via the line 130.

The existing water supply system does not need to be replaced for the integration of the device 100 and existing equipment can remain standard, as is. The device 100 integration does not require digging or burying anything. Only another line 130 for returning treated water to the pool 139 is added to the existing plumbing layout. The line 130 is equipped with a valve 135 and a module 140 with the device 100 located inside.

To power the device 100, a high-voltage power supply can be placed next to the module.

In this case, the main water return line 131 may or may not be equipped with a valve 134. If there is no valve 134 in the main line 131, then when the valve 135 is switched on in the line 130 with the reactor 100, water flows 1 will go along both lines 131 and 130. A line 130 equipped with the device 100 will supply the pool with treated, hydroxyl-enriched water. This water, when mixed with the existing volume of water in the pool, triggers chains of ionization reactions in volume with the production of highly active ROS, which deactivate and inhibit the development of the number of dangers pathogens.

When the module with the device 100 inside is disconnected from the high-voltage power supply, the water flow will circulate through the return line 130 without plasma treatment.

At the same time, the main volume of water will be circulated along the 131 line.

In the case of supplying the main line 131 with the valve 134, pool water treatment is more intensive due to the fact that when the valve 134 is closed, only plasma activated water saturated with radicals will enter the pool. Active radicals will interact with the pool water, deactivating pathogens.

Water Pool Robot Application

Figure 6:
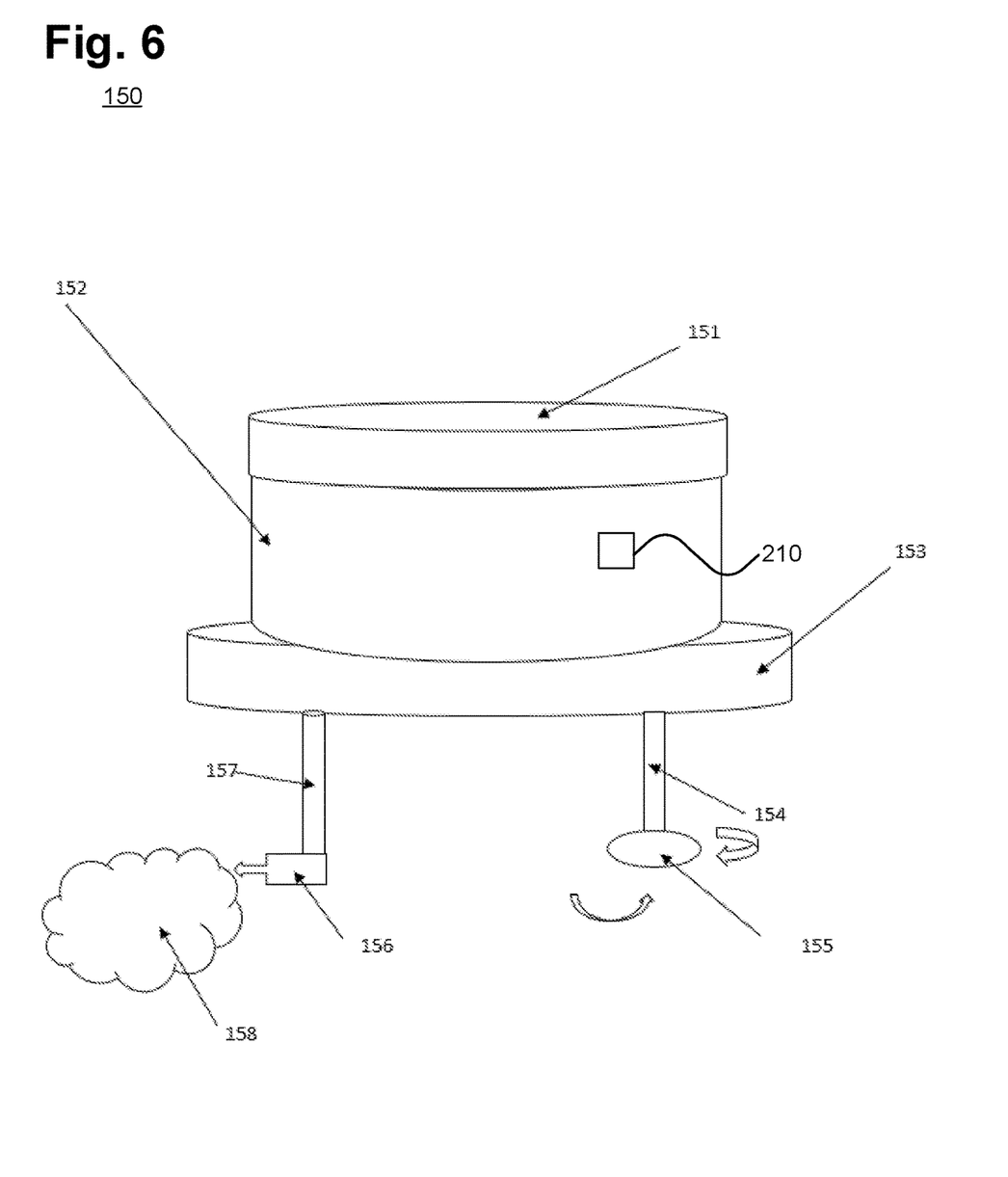
FIG. 6 is a diagram showing the floating robot integrating the device in accordance with one embodiment.

The device 100 can be integrated into a floating robot that can service a water pool, such as a swimming pool or an industrial pool. FIG. 6 is a diagram showing the floating robot 150 integrating the device 100 in accordance with one embodiment. The device 100 can be of either of the two embodiments described above with reference to FIGS. 1-2. In the initial position, the robot 150 is parked on the surface of the water in a certain place in the pool. For this, the pool is equipped with a parking space for the robot 150, such as an electromagnet securing the robot in place when necessary, though other ways to secure the robot 150 in place are also possible.

The robot 150 includes a floating pontoon 153 and other components assembled on the pontoon, including a water pump, a module of low-pressure flow-through hydrodynamic plasma reactor (the device 100), a solar panel 151, rechargeable batteries, a suction pipe 154, and a discharge pipe 157, a parking catcher (for interacting with the device securing the robot 150 in the parking space, such as another electromagnet), a programmable block that includes circuitry controlling other components, and sensors 210 for determining the position of the robot relative to the sides of the pool. The sensors can include Infrared (IR) Sensors, such as the Sharp GP2YOA41SKOF or the Pololu QTR line and use infrared light to measure the distance to objects can be used for position detection in proximity applications. The sensors 210 can also include camera-based vision systems, which utilize cameras to capture visual information and can be used for position tracking and object detection in local areas. The sensors 210 can also include Ultrasound Array Sensors, such as the Microchip MCP3241 or the Maxbotix MB8450, which use multiple ultrasonic transducers to detect and measure distances, enabling position determination in local areas. Other kinds of sensors 210 are possible. The device 100, the rechargeable battery, the pulse power supply, the controller, and the water pump can be encased within a single waterproof, hermetically sealed monoblock 152 on the pontoon 153.

The robot 150 works as follows. The robot 150 undocks from the securing mechanism of the parking space, the water pump is turned on, and the discharge pipe creates a jet stream 156 that drives the robot. The programmable block determines the position of the robot using the position sensors and controls the angular position of the discharge pipe 157, thereby setting the trajectory of the robot. The water is sucked in through the suction pipe 154, passes through the water pump, enters the module of device 100 and then, already purified, returns to the pool.

The movement of the robot in the water area of the pool is necessary for uniform processing of the volume of water in the pool.

The performance of the robot and the cyclicity of switching on is determined by the volume of water in the pool and the degree of the water's contamination with pollutants, such as pathogens.

Since the robot 150 is designed to maintain the quality of water in the pool within the regulated limits, then, as a rule, a couple of hours a day is enough for preventive treatment of water in the pool with a volume of up to 30,000 gallons and maintaining the degree of contamination within the regulated limits. These two hours should be chosen within the pool maintenance schedule, or at a time when there are no people in the pool.

Mobile Water Treatment Device Application

A further application of the device 100 is the device 100 being integrated into a mobile water treatment device. Mobile water treatment devices for emergency situations are compact, portable devices that are designed to purify water quickly and efficiently in situations where access to clean drinking water is limited or unavailable. These devices are typically used in emergency situations such as natural disasters, humanitarian crises, or military operations where clean drinking water is essential for survival.

There are different types of mobile water treatment devices available in the market, but most of them use a combination of physical, chemical, and biological methods to purify water. Some devices use reverse osmosis or ultrafiltration membranes to remove contaminants, while others use activated carbon or ion exchange resins to remove impurities. In addition, some devices use UV-C or ozone to disinfect water and eliminate harmful bacteria and viruses.

Mobile water treatment devices are designed to be easy to transport and operate, and they typically come with instructions for use that are easy to follow. They may be powered by electricity or manually operated, depending on the specific device. Some devices are designed to be used in conjunction with other water treatment technologies, such as portable water filtration systems, to provide a complete water treatment solution. Overall, mobile water treatment devices for emergency situations are an important tool for providing access to clean drinking water in situations where it may be otherwise unavailable. They play a critical role in helping to prevent the spread of waterborne diseases and ensuring that people have access to safe and clean drinking water during times of crisis.

Figure 7:
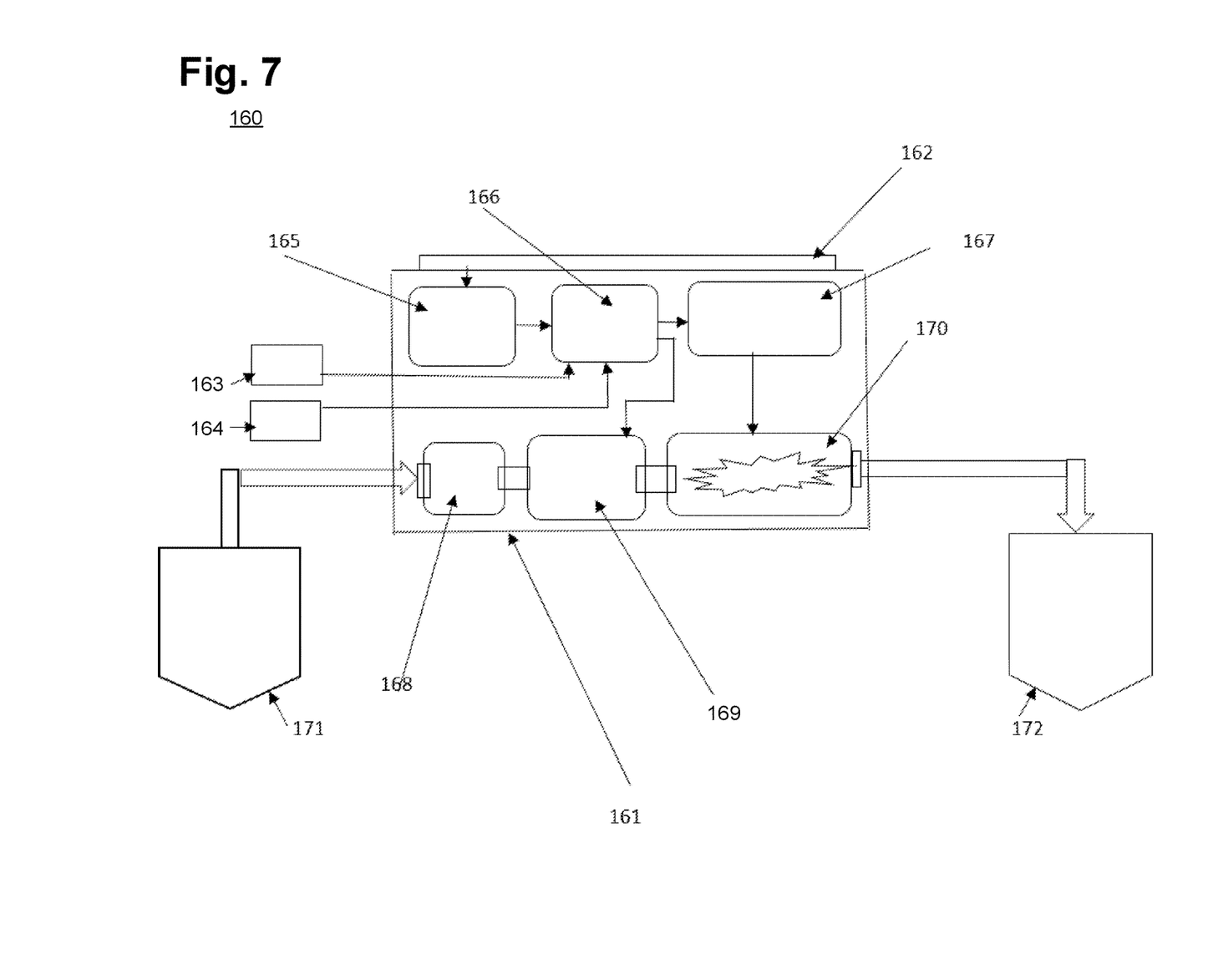
FIG. 7 is a diagram showing a mobile water treatment device that integrates the device in accordance with one embodiment.

The device 100 can be integrated into a mobile water treatment device, such as one shaped as a suitcase, as follows. FIG. 7 is a diagram showing a mobile water treatment device 160 that integrates the device 100 in accordance with one embodiment. The device 100 can be of either of the two embodiments described above with reference to FIGS. 1-2. The mobile water treatment device 160 includes: a durable mobile shell 161, inside which is the flow-through hydrodynamic plasma reactor (device 100), as well as a solar panel 162, rechargeable batteries 165, a controller 166 that controls operation of other components of the device 160 (including the device 100), a pulse HV (high voltage) power supply 166, a prefilter 168, and a water pump 169.

The device 160 works as follows. The water intake line is connected to a reservoir or to any wild source 171 of undrinkable water. When the water pump 169 is switched on, water 1 is sucked in from the source 171, passes through the coarse filter (prefilter) 168, enters the device 100, where the water is exposed to a volumetric plasma discharge, disinfected, and enters the clean water storage tank 172 through the treated water line. From the tank, water can be consumed for internal and external needs of humans, animals, for processing and cooking, etc. The controller allows to switch to a currently available power source. Possible power sources include either mains electricity, or batteries charged with a solar panel, or an external autonomous power source. The controller distributes the power supply to the water pump and to the pulsed high-voltage source. A pulsed high-voltage source provides a predetermined algorithm of power supply to the device 100.

While the invention has been particularly shown and described as referenced to the embodiments thereof, those skilled in the art will understand that the foregoing and other changes in form and detail may be made therein without departing from the spirit and scope.

What is claimed is:

1. A system for flow-through-hydrodynamic-plasma-reactor-based water treatment, comprising:
   a housing;
   a channel within the housing, the channel comprising an entrance into which water comprising one or more contaminants enters and an exit from which the water exits;
   an electrically conductive flow body installed in the channel and which at least some of the water encounters while flowing from the entrance to the exit, wherein the water that encounters the flow body flows around the flow body and creates a zone of turbulence after flowing around the body within which the water is in a two-phase state and comprises bubbles;
   an electrode located within the channel between the flow body and the exit;
   a pulse generator configured to apply one or more high voltage nanosecond duration pulses to the electrode and to the flow body, wherein the application of at least one of the pulses to the flow body and the electrode initiates an ignition in the zone of turbulence of a volumetric plasma discharge that generates one or more reactive oxygen species and wherein at least some of the contaminants are oxidized upon encountering the reactive oxygen species; and
   a plurality of magnets positioned on an outer surface of the housing and configured to apply a magnetic field to the water within the housing, wherein the magnetic field causes a spiral procession of at least some of the reactive oxygen species.

2. A system according to claim 1, further comprising:
   an air supply device configured to supply air to a reactor;
   a reactor within which the air passes through an high-voltage electric discharge, wherein the passing of the air through the high-voltage electric discharge creates one or more reactive nitrogen species; and
   a line connecting the reactor to the channel and through which the air with the one or more reactive nitrogen species enters the channel and mixes with the water.

3. A system according to claim 2, wherein the electric discharge comprises one or more of a corona discharge, a discharge with a dielectric barrier, a spark discharge, a low-current arc discharge, and a pulse discharge.

4. A system according to claim 2, further comprising at least one power source configured to supply power for a creation of the electric discharge.

5. A system according to claim 2, wherein presence of the reactive nitrogen species in the water promotes growth of plants to which that water is applied.

6. A system according to claim 1, wherein at least some of the magnets are permanent magnets.

7. A system according to claim 1, wherein at least some of the magnets are electromagnets.

8. A system according to claim 1, wherein a uniformity of distribution of the plasma within the channel depends on a degree of the turbulence in the zone.

9. A system according to claim 8, wherein the degree of the turbulence depends on a speed of the water encountering the flow body and a shape of the flow body.

10. A system according to claim 1, further comprising a controller in control of the pulse generator.

11. A system according to claim 10, further comprising:
    a pump;
    a suction line through which the water is brought from a pool to the pump;
    a further line through which the pump pumps the water to a filter;
    a first valve under a control of the controller whose closing prevents return of the water to the pool through a first return line; and
    a second valve under a control of the controller and whose opening allows the water to enter the channel and for at least some of the water to return to the pool via a second return line.

12. A system according to claim 11, further comprising: one or more sensors interfaced to the controller configured to obtain one or more characteristics of the water, wherein the controller controls opening and closing of the first and second valves based on the sensor characteristics.

13. A system according to claim 10, further comprising:
    a pontoon on which the housing is located, the pontoon configured to float in a pool;
    a pump configured to pump the water from the pool via a suction pipe and to pump the water into the entrance of the channel;
    a discharge pipe interfaced to the exit of the channel through which at least some of the water is returned to the pool, wherein a position of the discharge pipe is changeable under a control of the controller; and
    one or more sensors configured to determine a position of the pontoon within the pool, wherein the controller controls a direction of a movement of the pontoon by controlling the position of the discharge pipe based on data from the one or more sensors.

14. A system according to claim 13, further comprising:
    one or more rechargeable batteries positioned on the pontoon and configured to power the pulse generator and the pump;
    one or more solar panels positioned on the pontoon and configured to recharge the one or more rechargeable batteries; and
    a docking mechanism under a control of the controller and configured to dock and undock from a docking station in the pool based on a command from the controller.

15. A system according to claim 10, further comprising:
    a suit-case-shaped shell within which the housing is positioned;
    a pump within the shell connectable to a source of the water via a water intake line;
    a filter within the shell through which the water passes prior to reaching the entrance of the channel while being pumped by the pump; and
    a storage tank within the shell into which the water that exits the outlet enters.

16. A system according to claim 1, wherein the one or more contaminants comprise one or more pathogens.

17. A method for flow-through-hydrodynamic-plasma-reactor-based water treatment, comprising:
    providing water comprising one or more contaminants into a channel within a housing, the channel comprising an entrance into which the water enters and an exit from which the water exits, wherein an electrically conductive flow body is installed in the channel which at least some of the water encounters while flowing from the entrance to the exit, wherein the water that encounters the flow body flows around the flow body and creates a zone of turbulence after flowing around the body within which the water is in a two-phase state and comprises bubbles;

applying by a pulse generator one or more high voltage nanosecond duration pulses to the flow body and an electrode located within the channel between the flow body and the exit, wherein the application of at least one of the pulses to the flow body and the electrode initiates an ignition in the zone of turbulence of a volumetric plasma discharge that generates one or more reactive oxygen species and wherein at least some of the contaminants are oxidized upon encountering the reactive oxygen species; and applying a magnetic field to the water within the housing by a plurality of magnets positioned on an outer surface of the housing, wherein the magnetic field causes a spiral procession of at least some of the reactive oxygen species.

18. A system for flow-through-hydrodynamic-plasma-reactor-based pool water treatment, comprising:

a housing;

a channel within the housing, the channel comprising an entrance into which water comprising one or more contaminants enters and an exit from which the water exits;

an electrically conductive flow body installed in the channel and which at least some of the water encounters while flowing from the entrance to the exit, wherein the water that encounters the flow body flows around the flow body and creates a zone of turbulence after flowing around the body within which the water is in a two-phase state and comprises bubbles;

an electrode located within the channel between the flow body and the exit;

a pulse generator configured to apply one or more high voltage nanosecond duration pulses to the electrode and to the flow body, wherein the application of at least one of the pulses to the flow body and the electrode initiates an ignition in the zone of turbulence of a volumetric plasma discharge that generates one or more reactive oxygen species and wherein at least some of the contaminants are oxidized upon encountering the reactive oxygen species;

a controller in control of the pulse generator;

a pump;

a suction line through which the water is brought from a pool to the pump;

a further line through which the pump pumps the water to a filter;

a first valve under a control of the controller whose closing prevents return of the water to the pool through a first return line; and a second valve under a control of the controller and whose opening allows the water to enter the channel and for at least some of the water to return to the pool via a second return line.

19. A pontoon-based system for flow-through-hydrodynamic-plasma-reactor-based water treatment, comprising:

a housing;

a channel within the housing, the channel comprising an entrance into which water comprising one or more contaminants enters and an exit from which the water exits;

an electrically conductive flow body installed in the channel and which at least some of the water encounters while flowing from the entrance to the exit, wherein the water that encounters the flow body flows around the flow body and creates a zone of turbulence after flowing around the body within which the water is in a two-phase state and comprises bubbles;

an electrode located within the channel between the flow body and the exit;

a pulse generator configured to apply one or more high voltage nanosecond duration pulses to the electrode and to the flow body, wherein the application of at least one of the pulses to the flow body and the electrode initiates an ignition in the zone of turbulence of a volumetric plasma discharge that generates one or more reactive oxygen species and wherein at least some of the contaminants are oxidized upon encountering the reactive oxygen species;

a controller in control of the pulse generator;

a pontoon on which the housing is located, the pontoon configured to float in a pool;

a pump configured to pump the water from the pool via a suction pipe and to pump the water into the entrance of the channel;

a discharge pipe interfaced to the exit of the channel through which at least some of the water is returned to the pool, wherein a position of the discharge pipe is changeable under a control of the controller; and one or more sensors configured to determine a position of the pontoon within the pool, wherein the controller controls a direction of a movement of the pontoon by controlling the position of the discharge pipe based on data from the one or more sensors.

20. A suit-case-shaped system for flow-through-hydrodynamic-plasma-reactor-based water treatment, comprising:

a housing;

a channel within the housing, the channel comprising an entrance into which water comprising one or more contaminants enters and an exit from which the water exits;

an electrically conductive flow body installed in the channel and which at least some of the water encounters while flowing from the entrance to the exit, wherein the water that encounters the flow body flows around the flow body and creates a zone of turbulence after flowing around the body within which the water is in a two-phase state and comprises bubbles;

an electrode located within the channel between the flow body and the exit;

a pulse generator configured to apply one or more high voltage nanosecond duration pulses to the electrode and to the flow body, wherein the application of at least one of the pulses to the flow body and the electrode initiates an ignition in the zone of turbulence of a volumetric plasma discharge that generates one or more reactive oxygen species and wherein at least some of the contaminants are oxidized upon encountering the reactive oxygen species;

a controller in control of the pulse generator;

a suit-case-shaped shell within which the housing is positioned;

a pump within the shell connectable to a source of the water via a water intake line;

a filter within the shell through which the water passes prior to reaching the entrance of the channel while being pumped by the pump; and a storage tank within the shell into which the water that exits the outlet enters.

\* \* \* \* \*